United States Patent [19]

Lücke et al.

[11] Patent Number: 4,497,879
[45] Date of Patent: Feb. 5, 1985

[54] ELECTROCHEMICAL STORAGE CELL

[75] Inventors: Hans-Hermann Lücke, Walldorf; Jens-Christian Jessen, Eppelheim, both of Fed. Rep. of Germany

[73] Assignee: Brown, Boveri & Cie Aktiengesellschaft, Manheim, Fed. Rep. of Germany

[21] Appl. No.: 500,332

[22] Filed: Jun. 2, 1983

[30] Foreign Application Priority Data

Jun. 3, 1982 [DE] Fed. Rep. of Germany ....... 3220903
Jun. 16, 1982 [DE] Fed. Rep. of Germany ....... 3222525

[51] Int. Cl.³ .................... H01M 10/39; H01M 10/50
[52] U.S. Cl. ........................................ 429/62; 429/104
[58] Field of Search ................. 429/104, 121, 61, 62

[56] References Cited

U.S. PATENT DOCUMENTS 4,011,366 3/1977 Bones et al. .................... 429/61
4,207,386 6/1980 Meinhold et al. .................... 429/104
4,252,869 2/1981 Heitz et al. .................... 429/121
4,414,297 11/1983 Fischer .................... 429/104

*Primary Examiner*—Donald L. Walton
*Attorney, Agent, or Firm*—Herbert L. Lerner; Laurence A. Greenberg

[57] ABSTRACT

Electrochemical storage cell of the alkali metal and chalcogen type with at least two electric terminals as well as at least one anode chamber and one cathode chamber which are both provided with at least one current collector and are separated from each other by an alkali-ion-conducting solid electrolyte as well as are bounded at least in some areas by a metallic housing. The two electric terminals are integrated in one component and are connected to each other electrically via the alloy of a fusible component if the temperature in the storage cell rises to a value above the operating temperature of the storage cell.

3 Claims, 2 Drawing Figures

ELECTROCHEMICAL STORAGE CELL

BACKGROUND OF THE INVENTION

1. Field of the Invention

The invention relates to an electrochemical storage cell of the alkali metal and chalcogen type with at least one anode chamber and one cathode chamber. Each chamber is provided with at least one current collector. The chambers are separated from each other by an alkali-ion-conducting solid electrolyte and bounded at least in some areas by a metallic housing.

2. Description of the Prior Art

Such rechargeable electrochemical storage cells with solid electrolytes are highly suitable for the design of high-energy storage cells with high power density. Such storage batteries are being used increasingly as the electric energy source for electric vehicles. The solid electrolytes used in the alkali/chalcogen storage cells, which are made, for instance, of beta-aluminum oxide, are characterized by the feature that the partial conductivity of the mobile ion is very high and the partial conductivity of the electrons is smaller by many powers of ten. The effect of the use of such solid electrolytes for the design of electrochemical storage cells is that practically no self-discharge takes place, since the electron conductivity is negligibly small and the reaction substances as neutral particles also cannot get through the solid electrolyte.

For the manufacture of storage cells and high-temperature storage batteries, a multiplicity of such electrochemical storage cells are wired together. In high-temperature storage cells for electric vehicles, for instance, it is necessary to connect many electrochemical storage cells in series and only few storage cells in parallel. Reasons therefor are that the energy content of such a high-temperature storage battery will generally be smaller than 40 kWh, but the energy content of a single storage cell will be larger than 80 Wh. It follows that such a high-temperature storage battery will contain not more than 500 storage cells. If the individual storage cell has a voltage of about 2 V and a total of 200 V is to be generated with such a battery, then 100 storage cells must be connected in series. This means that at most 5 storage cells can be connected in parallel. If an overload occurs in one or more storage cells of this series circuit, the temperature in the interior of the storage cell is increased. A temperature rise above the operating temperature of the storage cell can, however, lead to its destruction. The resistance of such a defective cell becomes high, whereby the overall current flow through the series circuit in which this storage cell is located, is interrupted.

German Published Non-Prosecuted Application DE-OS No. 28 19 583 discloses an electrochemical storage cell having a circuit which is interrupted if the temperature of the storage cell rises substantially above its operating temperature. In this storage cell, at least one of the two current collectors consists of two parts. The first part is arranged outside, and the second part inside the storage cell. The two parts are connected together via an electrically conducting contact element which melts at a temperature which is above the operating temperature of the storage cell by a presettable amount. Thereby, the circuit through the storage cell is interrupted. It is a disadvantage here that the electric conductivity of the current collector is reduced by the subdivision into several sections, particularly by the insertion of a fusible contact element, because corrosion at the contact points can lead to a reduction of the conductivity.

SUMMARY OF THE INVENTION

An object of the invention to provide an electrochemical storage cell which is automatically separated from the circuit of the high-temperature storage battery if its inside temperature rises above the operating temperature of about 350 degree C.

With the foregoing and other objects in view, there is provided, in accordance with the invention, an electrochemical storage cell of the alkali metal and chalcogen type with an anode chamber and a cathode chamber, each chamber provided with a current collector, the two chambers separated from each other by an alkali-ion conducting solid electrolyte as well as bounded at least in some areas by metallic housing, and two electric terminals, the combination therewith of integrating the two electric terminals in one component together with an alloy of a fusible component which has a predetermined melting point above the operating temperature of the cell, the two terminals connected electrically by the alloy when the cell reaches the predetermined melting point.

In accordance with the invention, there is provided an electrochemical storage cell of the alkali metal and chalcogen type with at least one anode chamber and one cathode chamber, each anode chamber and each cathode chamber provided with at least one current collector, the anode and the cathode chamber separated from each other by an alkali-ion-conducting solid electrolyte and bounded at least on some areas by a metallic housing, the combination therewith of a fusible component having a predetermined melting point above the operating temperature of the cell to electrically connect the two current collectors via the electrically conductive material of the fusible component if the temperature rises to a value which is only slightly above the operating temperature of the storage cell.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINS

The invention, however, together with additional objects and advantages thereof will be best understood from the following description when read in connection with the accompanying drawings in which:

FIG. 1 is an electrochemical storage cell shown schematically in a vertical section in accordance with the invention. An outer metallic housing encloses a cup-shaped solid electrolyte. The space between the housing and the electrolyte is the cathode chamber, and the interior of the electrolyte is the anode chamber. The metal housing is the cathode current collector. The anodic current collector is a tube with its bottom end closed. The tube is inserted in the anode chamber. A second tube of small diameter with its bottom end open is inserted in the first tube and separated therefrom by insulation. A plug of an alloy with a predetermined melting point above the operating temperature of the cell is inserted in the bottom of the second tube. A rod extends down in the second tube with the upper part of the rod connected to the housing and the bottom of the rod embedded in the plug. The second tube is set with its bottom a short distance above the bottom of the first tube forming a space therebetween. This space is related to the size of the plug such that melting of the plug breaks the connection between the second tube and the housing and connects the second and first tubes.

FIG. 2 is a variant of the storage cell of FIG. 1 in which the fusible material is in thermal contact with the outer tube but insulated from the inner cylinder. When the fusible material melts, it contacts the outer tube and the cylinder. Such device is sensitive to temperature changes in the cell.

DETAILED DESCRIPTION OF THE INVENTION

Figure 1:
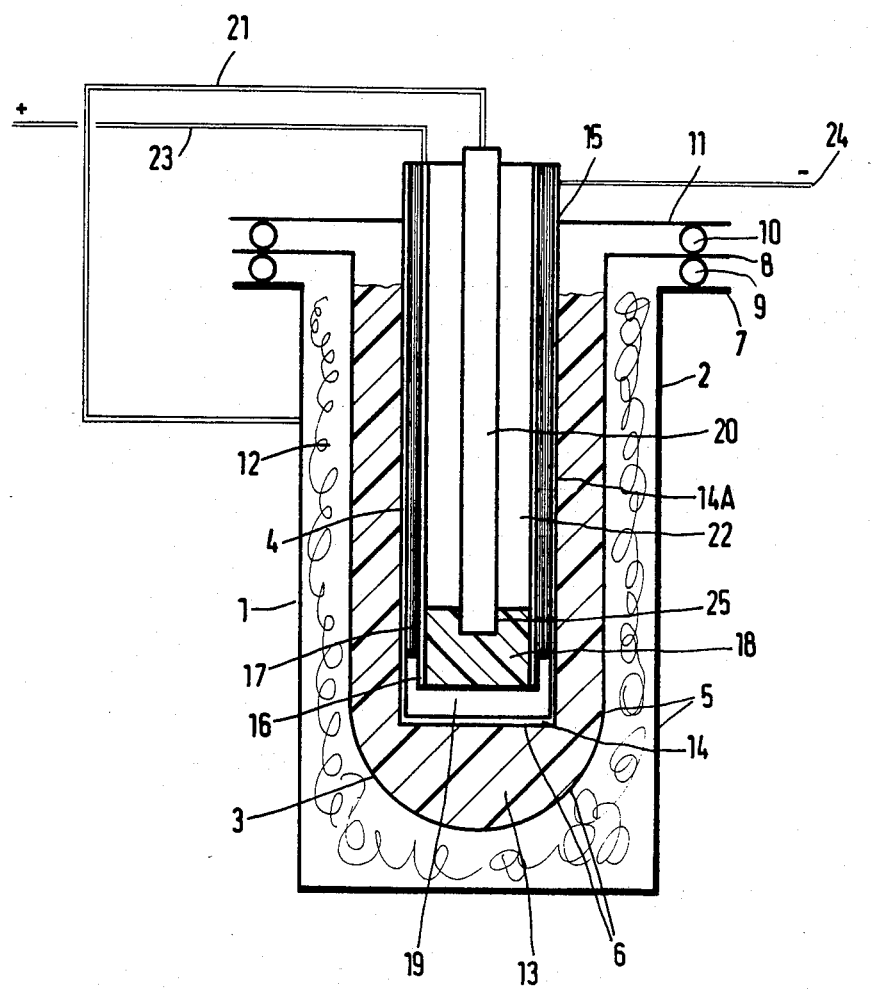

According to the invention, the first current collector is designed as a tube which is closed at one end and is arranged with its closed end in the interior of the cup-shaped solid electrolyte serving as the reactant space. The cup-shaped metallic housing which is in communication with the second reactant space serves as the second current collector. A second electrically conducting tube is arranged in the interior of the tube closed at one end. The lower end of the second tube is closed off by a fusible electrically conducting plug and is arranged that a pre-settable distance from the closed end of the outer tube. Insulating material is arranged all around between the inside surfaces of the outer tube and the outside surfaces of the inner tube. An electrically conducting rod is installed within the inner tube. The rod is arranged in a recess of the plug which terminates the inner tube and is connected to the plug in an electrically conducting manner. The space between the rod and the inner tube can be filled with insulating material, but it can be kept empty, i.e., no electrically conductive material is arranged therein. The rod is connected in an electrically conducting manner to the metallic housing of the storage cell. The inner tube serves as the first electric terminal, while the upper end of the outer tube serves as the second electric terminal. The plug which terminates the inner tube at the lower end, is made of an electrically conductive material which begins to melt at a temperature which is only slightly above the operating temperature of the storage cell.

If in the electrochemical storage cell according to the invention, the temperature rises to values which are above the operating temperature of the storage cell, then the plug at the lower end of the inner tube starts to melt. The lower end of the inner tube is arranged only such distance from the closed end of the outer tube that the space between the two tubes will be filled completely by the melted material of the plug to connect the two tubes together in an electrically conducting manner.

If a temperature rise of longer duration occurs within the storage cell, the plug melts completely. Thereby, the electrically conducting contact between the inner tube and the metallic housing of the storage cell is interrupted. Through the melting material of the plug, an electrically conducting connection between the inner tube and the outer tube is now formed which serves as the current collector and the electric terminal. By this measure, the circuit through the electrochemical storage cell is bridged. Current and also short-circuit current no longer flow through the storage cell. It is ensured thereby that the resistance of the storage cell cannot become high. The charging and discharge current flowing through the remaining storage cells has no influence on the storage cell.

In another embodiment according to the invention, the metallic housing of the storage cell serves likewise as the current collector, while a second current collector is formed by the tube which is closed at one end. This second current collector extends with its closed end into the cup-shaped solid electrolyte. An electrically conducting cylinder is arranged in the interior of the tube. The lower end of the cylinder is arranged at a pre-settable distance from the bottom of the tube. Insulating material is arranged all around between the lateral outside surfaces of the cylinder and the lateral inside surfaces of the tube. The cylinder is connected in an electrically conducting manner to the metallic housing of the storage cell via an electric conductor which serves as an electric terminal. At its lower end, the cylinder has a hole which is lined with insulating material. A fusible metallic component is inserted and held in the hole. The component is made of an alloy which melts at a temperature only slightly above the operating temperature of the storage cell. The distance between the cylinder and the bottom of the tube is chosen only large enough such that the material of the melted component fills the space between the cylinder and the tube completely and forms an electrically conducting connection between the tube and the cylinder. To enable the component to respond immediately to a change in the temperature within the storage cell, the component is connected in a heat-conducting manner to the tube which serves as the current collector.

If a disturbance of the normal charging and discharge process or an overlead of the storage cell occurs therein, this can result in a temperature rise in the interior of the storage cell. If the temperature within the storage cell rises substantially above the operating temperature of 350° C., then the component arranged in the hole of the cylinder starts to melt. If the disturbance is of longer duration, then the component melts completely. The melt fills the space between the cylinder and the tube completely, forming an electrically conducting connection whereby the two current collectors of the storage cell are shorted together. A short circuit current then flows through the storage cell only until the latter is discharged completely. Subsequently, the current flow through the storage cell is completely interrupted.

The invention will be described in the following. Referring to FIG. 1, the electrochemical storage cell 1 of the sodium-and-sulfur type has a metallic housing 2, a solid electrolyte 3 and a rod-shaped current collector 4. The metallic housing 2 is cup-shaped. The cup-shaped solid electrolyte 3 is arranged in the interior of this cup-shaped housing 2. The solid electrolyte 3 is made of beta-aluminum oxide. Its dimensions are chosen to produce a coherent space 5 between its outer boundary surfaces and the inner boundary surfaces of the metallic housing 2. Space 5 serves as the cathode chamber in the embodiment example shown here. The interior of the solid electrolyte 3 is used as the anode chamber 6. The metallic housing 2 is provided at its open end with an outward-pointing flange 7. Placed above the latter is another outward-pointing flange 8 of the solid electrolyte 3. The flange 8 of the solid electrolyte 3 is formed by an insulating ring which is made of alpha-aluminum oxide. The connection between the solid electrolyte 3 and the insulating ring is made via glass solder (not shown here). The insulating ring is designed to extend outward beyond the solid electrolyte 3 and thereby also functions as a flange. A gasket 9 is preferably arranged between the flange 7 of the housing 2 and the flange 8 of the solid electrolyte 3. The cathode chamber 5 is located between the housing 2 and the solid electrolyte 3 is completely sealed against the anode chamber 6 and to the outside by the flange 8 of the solid electrolyte 3. The anode chamber 6 is sealed by a cover plate 11 which is made of a corrosion-resistant material. The cover plate 11 rests on the flange 8 of the solid electrolyte 3. A gasket 10 is arranged between the flange 8 and the cover plate 11. The cathode chamber 5 located between the metallic housing 2 and the solid electrolyte 3 is filled with a graphite felt 12 which is saturated with sulfur. In the embodiment example shown here, the metallic housing 2 serves as the cathodic current collector. The anodic current collector 4 extends far into the cup-shaped solid electrolyte 3 and in particular, into the anode chamber 6. In the embodiment shown here, the anode chamber 6 is filled with a metal felt 13 which is saturated with liquid sodium. The metal felt 13 is arranged so that is closely encloses the anodic current collector 4 and firmly rests against the inside surfaces of the solid electrolyte 3. The metal felt 13 acts as a capillary structure, whereby continuous wetting of the inside surfaces of the solid electrolyte 3 with sodium is achieved. The anodic current collector 4 is formed by a tube which is closed on one side and is made, for instance, of steel. The closed end of this tube 14 is arranged in the lower region of the solid electrolyte 3. The open end of the tube 14 is brought through an opening 15 in the cover plate 11 to the outside and extends beyond this plate by several millimeters. A second tube 16, the outside diamter of which is slightly smaller than the inside diameter of the tube 14 is arranged in the interior of the tube 14. Insulating material 17 is arranged all around between the lateral boundary surfaces of the two tubes 14 and 16. The end of the tube 16 which is arranged in the interior of the tube 14 is closed by a plug 18. The plug 18 is made of an electrically conductive material, especially of an alloy which begins to melt at a temperature above the operating temperature, especially above 350° C. The end of the tube 16 which is closed by the plug 18 is arranged at a pre-settable distance from the closed end of the tub 14, to form an empty space 19 between the lower ends of the two tubes 14 and 16. The space 19 is made just large enough that the melted alloy will fill this space 19 if the plug melts, and make an electrically conducting connection between the tubes 14 and 16. In order to obtain a good, electrically conducting contact between the tube 14 and the tube 16, the insulation 17 which is arranged between the lateral boundary surfaces of the tube 14 and the tube 16, is not brought all the way to the lower end of the tube 16. An electrically conducting rod 20 is arranged in the interior of the tube 16, with the lower end of rod 20 in a recess 25 of the plug 18. The rod 20 is in electrically conducting connection via the plug 18 with the tube 16. The rod 20 is connected, preferably at its upper end, via an electric conductor 21 to the metallic housing 2 of the storage cell 1. Insulating material 22 is arranged between the inside surfaces of the tube 16 and the outside surfaces of the rod 20. This may be a solid cylinder of insulating material which has a through hole into which the rod 20 is inserted and is held there. The outside diameter of such a cylinder is chosen so that it can just be inserted into the interior of the tube 16 and because of the tight fit is held between the inside surfaces of the tube 16. Polytetrafluoroethylene, for instance, is suitable as the insulating material. In such a cylinder, the hole for the rod 20 is made with an inside diameter which is somewhat smaller than the outside diameter of the rod 20. To insert the rod 20 into the hole, the cylinder is warmed up to a temperature of 400° to 500° C., causing the inside diameter of the hole to be increased and the rod 20 readily inserted. When the cylinder 22 is cooled down to the operating temperature, the inside diameter of the hole becomes somewhat smaller again, so that the cylinder 22 firmly grips the rod 20. The outside diameter of such a cylinder 22 is chosen somewhat larger then the inside diameter of the tube 16. To insert the cylinder 22 into the tube 16, the former is cooled down to a temperature below room temperature, whereby its outside diameter becomes somewhat smaller, The cooled cylinder can be inserted into the interior of the tube 16 without difficulty. If the cylinder 22 is warmed up to room temperature again, it attempts to assume its original size. It is thereby pressed firmly against the inside surfaces of the tube 16, and thus occupies a firm seat within the tube 16.

The upper end of the tube 16 is connected in the embodiment shown here to an electric conductor 23, via which it is connected to the next storage cell (not shown here). A second electric conductor 24 is connected to the upper end of the tube 14 and serves likewise for connection to a further storage cell (not shown here).

If a temperature rise above the operating temperature of the storage cell occurs therein, i.e., if temperature values of 400 or more degrees C. are reached, the plug 18 begins to melt. This plug is made of an alloy, the melting point of which is between 350° and 400° C. If the plug 18 is melted completely, the electrically conducting connection between the tube 16 and the rod 20, which is in electrically conducting connection with the metallic housing 2 of the storage cell, is completely interrupted. The alloy that has flowed into the space 19 fills this space completely and forms an electrically conducting connection between the tube 14 and the tube 16. By interrupting the electrically conducting contact between the metallic housing 2 serving as the current collector of the cathode chamber 5 and the electric terminal 16 of the storage cell 1, the circuit through this storage cell is interrupted. By virtue of plug 18 melting, the electrically conducting connection between the tube 14 and the tube 16 is made, the storage cell is bridged. If the storage cell 1 is connected into a series circuit of several storage cells (not shown here), the charging and discharging current of the other storage cells of this series circuit flows between the two electric terminals 14 and 16 without these currents having any influence on this storage cell 1. Undercharging of the storage cell and a short-circuit current thereby cannot occur. If, for instance, the storage cells connected in series with this storage cell are not yet completely discharged, the discharge current coming from these storage cells flows via the two terminals 14 and 16.

Figure 2:
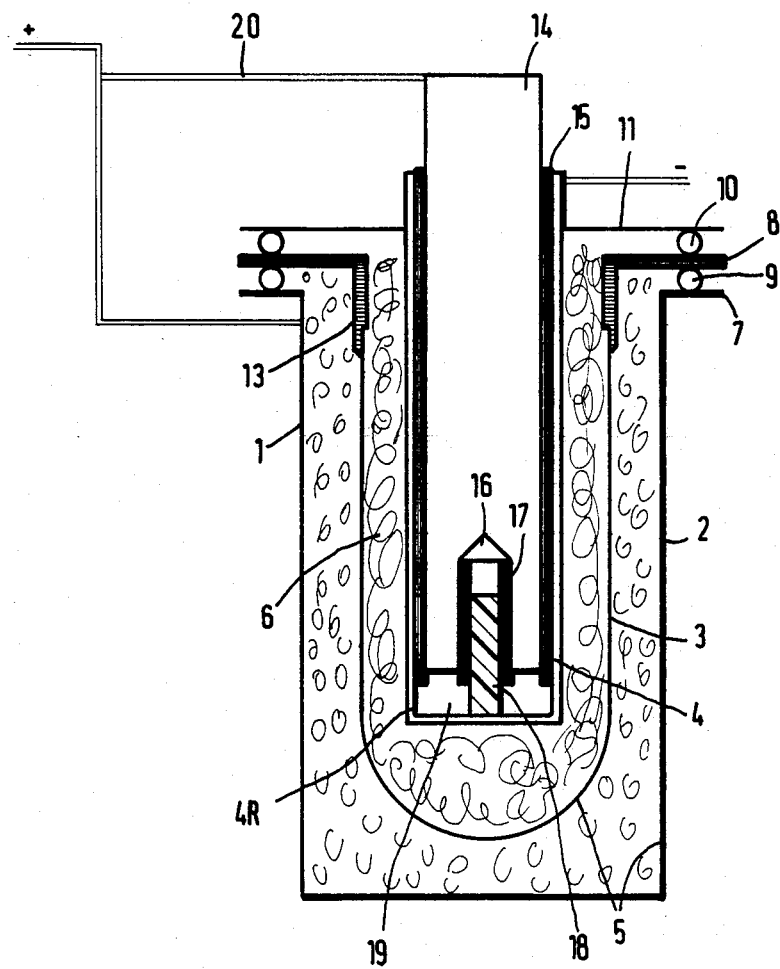

The electrochemical storage cell 1 likewise shown in a vertical section in FIG. 2 is constructed basically of a metallic housing 2, a solid electrolyte 3 and a rod-shaped current collector 4. Its metallic housing 2 likewise has the shape of a cup. The cup-shaped solid electrolyte 3 is arranged in the interior of the housing 2. Here also, the solid electrolyte 3 is made of beta-aluminum oxide. Its dimensions are chosen to form a coherent space 5 between the inside boundary surfaces of the metallic housing 2 and its outside boundary surfaces. In the embodiment example shown here, the space 5 serves as the cathode chamber. The latter is filled with a graphite felt 12 which is saturated with the sulfur. The interior of the solid electrolyte 3 is used as the anode chamber 6. The metallic housing is provided at tis upper end with an outward-pointing flange 7. On the latter is supported the outward-pointing flange 8 of the solid electrolyte 3. The flange 8 of the solid electrolyte 3 is formed by an insulating ring made of alpha-aluminum oxide. The connection between the solid electrolyte 3 and the insulating ring 8 is made via glass solder (not shown here). The insulating ring 8 is designed to extend outward beyond the solid electrolyte 3 and also to function as a flange. A gasket 9 is preferably arranged between the flange 7 of the housing 2 and the flange 8 of the solid electrolyte 3. The cathode chamber located between the housing 2 and the solid electrolyte 3 is completely sealed to the outside from the anode chamber 6 by the flange 8 of the solid electrolyte 3. The anode chamber is sealed off by a cover plate 11 which is made of a non-conductive corrosion-resistant material. The cover plate 11 rests on the flange 8 of the solid electrolyte 3. A gasket 10 is arranged between the flange 8 and the plate 11. In the embodiment example shown here, the metallic housing assumes the function of the cathodic current collector. The anodic current collector 4 has the form of a rod and extends far into the cup-shaped solid electrolyte 3, especially the anode chamber 6. The anode chamber 6 is filled with a metal felt 13 which is saturated with liquid sodium. The metal felt is arranged so that it surrounds the current collector 4 closely and rests firmly against the inside surfaces of the solid electrolyte 3. The metal felt 13 has the effect of a capillary structure, whereby the inside surfaces of the solid electrolyte 3 are always wetted with sodium, which is necessary for optimum operation of the storage cell 1. The anodic current collector 4 is formed by a tube 4R which is closed on one end. The tube 4R with its closed end is arranged in the cup-shaped solid electrolyte 3. A rod or cylinder 14 made of electrically conductive material is arranged inside the tube 4R. The outside diameter of the cylinder 14 is slightly smaller than the inside diameter of the tube 4R. Insulating material 15 is arranged between the lateral inside surfaces of the tube 4R and the lateral outside surfaces of the cylinder 14, to prevent formation of an electrically conducting connection between the tube 4R and the cylinder 14. The end of the cylinder 14 arranged in the tube 4R has a hole 16 which extends in the longitudinal axis of the cylinder 14. The hole is lined with insulating material 17. Inside the hole 16, a fusible component 18 is arranged and held. The component 18 is made of an alloy which begins to melt at a temperature which is only slightly above the operating temperature of the storage cell. The length of the component 18 is chosen so that it is at least in heat-conducting contact with the bottom of the tube 4R. The lower end of the cylinder 14 is arranged at a pre-settable distance from the closed end of the tube 4R. The distance is chosen so that the volume of the space 19 remaining between the cylinder 14 and the tube 4R is as large as the volume of the component 18. In particular, the size of the space 19 is chosen so that the material of the melting component fills the space 19 completely if the temperature rises above the operating temperature of the storage cell and forms an electrically conducting connection between the cylinder 14 and the tube 4R. The open end of the tube 4R is brought in the embodiment example shown here through a central opening in the cover plate 11 and protrudes a few millimeter beyond the latter. The cylinder 14 protrudes from the storage cell 1 and is connected in an electrically conducting manner to the metallic housing 2 of the storage cell 1 via an electric conductor 20 which serves as an electric terminal of the storage cell 1. The upper end of the tube 4R serves as the second electric terminal. If a temperature rise occurs within the storage cell, the two current collectors are connected in an electrically conducting manner to each other by the melt of the component 18.

The invention is not limited to the embodiment examples shown in FIGS. 1 and 2, but rather comprises an electrochemical storage cell, in which the two electric current collectors or the two electric terminals are permanently shorted together during a rise in temperature. The storage cells shown in FIGS. 1 and 2 can also be operated in this form as inverted storage cells.

The foregoing is a description corresponding, in substance, to German application No. P 32 20 903.7 dated June 3, 1982 and No. P 32 22 525.3 dated June 16, 1982, international priority of which is being claimed for the instant application, and which are hereby made part of this application. Any material discrepancies between the foregoing specification and the specifications of the aforementioned corresponding German applications are to be resolved in favor of the latter.

There are claimed:

1. Electrochemical storage cell of the alkali metal and chalcogen type with an anode chamber and a cathode chamber, each chamber provided with a current collector, the two chambers separated from each other by an alkali-ion-conducting solid electrolyte as well as bounded at least in some areas by a metallic housing, two electric terminals, one of said two electric current collectors is shaped as a tube closed at one end with its closed end in the interior of the cup-shaped solid electrolyte, a second electrically conducting tube is arranged within said tube, an electrically conducting plug of a fusible alloy closes off the lower end of the second tube which is spaced a pre-settable distance from the closed end of the first tube to provide a space between the ends of the first and second tubes related to the size of the plug that the melted plug will fill the space with only the two tubes connected via the alloy in an electrically conducting manner, an insulating material is arranged between the inside surfaces of the first tube and the outside surfaces of the second tube in its upper part, a cylindrical conducting rod is arranged within the second tube, said rod having its lower end disposed in a recess of the plug closing-off the second tube and is connected to the latter in an electrically conducting manner, insulating material is arranged between the rod and the second tube, the rod is connected in an electrically conducting manner to the metallic housing of the storage cell, and one of said two electric terminals of the storage cell is formed by the second tube, and the other electric terminal is the first tube.

2. Electrochemical storage cell according to claim 1, wherein the metallic cup-shaped housing of the storage cell which is in communication with one of the two reactant spaces serves as the other current collector and is connected in an electrically conducting manner with the rod arranged in the interior of the second tube.

3. Electrochemical storage cell of the alkali metal and chalcogen type with at least one anode chamber and one cathode chamber, each anode chamber and each cathode chamber provided with at least one current collector, the anode and cathode chambers separated from each other by an alkali-ion-conducting cup-shaped solid electrolyte and bounded at least in some areas by a metallic housing, two electric terminals, the metallic housing serving as one of said two current collectors, the other current collector shaped as a tube closed on one end with its closed end in the cup-shaped solid electrolyte, a cylinder arranged in the interior of the tube with the lower end of the cylinder at a pre-settable distance from the bottom of the tube, insulating material arranged all around between lateral outside surfaces of the cylinder and lateral inside surfaces of the tube, the cylinder has at its underside a hole which is lined with insulating material into which a fusible metallic component is inserted and is held there, said metallic component made of an alloy which melts at a temperature only a few degrees above the operating temperature of the storage cell, said metallic component is in heat-conducting contact with the tube, and the distance between the cylinder and the bottom of the tube is set to be only large enough to fill the space between the tube and the cylinder with metallic component after melting and form an electrically conducting connection between the tube and the cylinder, the metal housing is electrically connected with the cylinder by an electric conductor which serves as a first electric terminal and the upper end of the tube serves as a second electric terminal.

* * * * *